(12) United States Patent
Loef

(10) Patent No.: US 6,724,644 B2
(45) Date of Patent: Apr. 20, 2004

(54) AC/DC CONVERTER

(75) Inventor: Christoph Loef, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/169,814

(22) PCT Filed: Nov. 9, 2001

(86) PCT No.: PCT/EP01/13100

§ 371 (c)(1),
(2), (4) Date: Jul. 9, 2002

(87) PCT Pub. No.: WO02/39572

PCT Pub. Date: May 16, 2002

(65) Prior Publication Data

US 2002/0191428 A1 Dec. 19, 2002

(30) Foreign Application Priority Data

Nov. 11, 2000 (DE) .......................................... 100 56 022

(51) Int. Cl.$^7$ .............................................. H02M 7/04
(52) U.S. Cl. ............................ 363/89; 363/17; 363/132
(58) Field of Search ........................... 363/17, 98, 132, 363/89, 125, 127

(56) References Cited

U.S. PATENT DOCUMENTS

| 4,967,332 A | * | 10/1990 | Claydon et al. ............... 363/17 |
| 5,982,159 A | * | 11/1999 | Janczak et al. ............. 323/282 |
| 6,046,914 A | * | 4/2000 | Lauter ......................... 363/37 |

FOREIGN PATENT DOCUMENTS

| DE | 19824409 A | 12/1999 | ............ H02M/7/06 |
| DE | 19824409 | 12/1999 | ............ H02M/7/06 |
| EP | 0838893 A2 | 4/1998 | ............ H02M/1/10 |

* cited by examiner

Primary Examiner—Michael Sherry
Assistant Examiner—Gary L. Laxton

(57) ABSTRACT

An AC/DC converter includes a resonance converter (A3) which is suitable, for example, for operation with different AC line voltages from different AC power grids. The AC/DC converter further includes a bridge circuit (A4) drivable as a full-bridge circuit and as a half-bridge circuit, an arrangement (A2) working as an up-converter coupled, at least via a capacitor, (C2) to the resonance converter (A3), and a transformer (T) in the resonance converter (A3) and realizing a point (7) at which the arrangement (A2) is capacitively (C2) coupled to the resonance converter (A3). The primary winding of the transformer (T) is divided and this dividing point is arranged as the point (7).

18 Claims, 3 Drawing Sheets

AC/DC CONVERTER

BACKGROUND OF THE INVENTION

1. Field of the Invention

The invention relates to an AC/DC converter comprising a resonance converter.

2. Description of the Related Art

Such AC/DC converters are used for converting an AC voltage into a DC voltage in, for example, television sets or discharge lamps, in the form of switched-mode power supplies so as to convert an AC line voltage into a DC supply voltage.

An AC/DC converter, which forms a load on a public AC power grid, is subject to particular requirements as regards the current which may be taken from the AC power grid. For example, the current taken up by the AC/DC converter may customarily have only a limited harmonic part, i.e., the AC/DC converter should, in essence, represent an ohmic resistance. Such requirements are further specified in, for example, IEC 1000-3-2.

German Offenlegungsschrift DE 198 24 409 A1, corresponding to U.S. Pat. No. 6,046,914, discloses an AC/DC converter comprising a resonance converter which directly connects an up-converter comprising purely passive components to the output of a half-bridge. The publication by W. Chen, F. C. Lee and T. Yamauchi "An improved 'Charge Pump' electronic ballast with low THD and low crest factor", IEEE APEC '96 Proceedings, pp. 622–627, contains further possibilities of realizing such an arrangement. On the other hand, J. Wustehube, Schaltnetzteile, second revised edition, p. 139 ff., describes a bridge rectifier circuit with a switch-over device by means of which the bridge rectifier circuit is adapted to the respectively present AC line voltage (110–127 volts, for example, in the USA or 220–240 volts, for example, in Europe), so that the generated DC voltage has substantially the same values irrespective of the applied AC line voltage.

SUMMARY OF THE INVENTION

It is an object of the invention to provide an AC/DC converter comprising a resonance converter which is highly cost-effective and suitable for use with different AC line voltages from different AC power grids. The current taken up by the AC/DC converter is then to have only a limited harmonic part and work, in essence, as an ohmic resistance.

This object is achieved by an AC/DC converter comprising a first rectifier arrangement for generating a rectified AC voltage from a first AC voltage present on an input of the AC/DC converter, a first smoothing capacitor arrangement for smoothing the rectified AC voltage thereby forming a smoothed rectified AC voltage, a bridge circuit including a first, second, third and fourth switching element for converting the smoothed rectified AC voltage into a further AC voltage, a resonance converter comprising resonant circuit elements for converting the further AC voltage into a DC output voltage available on an output of the AC/DC converter, a control circuit for controlling the switching elements of the bridge circuit, wherein a first mode is provided in which the bridge circuit is operated as a half-bridge circuit by changing the switching states of the first and second switching elements and the switching states of the third and fourth switching elements are not changed, and wherein a second mode is provided in which the bridge circuit is operated as a full-bridge circuit by changing the switching states of all four switching elements, an arrangement working as an up-converter connected between the first rectifier arrangement and the first smoothing capacitor arrangement, said arrangement comprising at least one diode and a coupling capacitor, said coupling capacitor being coupled on one end to a junction point between the first rectifier arrangement and the at least one diode, and being coupled, on the other end, to a point inside the resonance converter, whereby, during the operation of the AC/DC converter, a potential modulated with the operating frequency of the resonance converter is fed back.

By using the two modes, the ratio of the DC output voltage to the first AC voltage present on the input of the AC/DC converter can be adjusted. This adjusting option reduces the requirements of the control circuit and allows the use of the same components for AC/DC converters that are provided for the operation with different AC line voltages, these voltages being present as a first AC voltage on the AC/DC converter, or for different DC output voltages. This leads to a considerable saving of cost of the AC/DC converter.

The use of the arrangement coupled to the resonance converter and working as an up-converter, leads to a further reduction of the harmonic part which is fed back into the AC power grid. Furthermore, the arrangement working as an up-converter provides a stabilization of the smoothed rectified AC voltage. This again reduces the requirements of the control circuit.

Variants of the invention, in which, for example, the arrangement working as an up-converter comprises a further diode connected in series between the first rectifier arrangement and the junction point to which the coupling capacitor is coupled, and an inductance connected between this further diode and the junction point of the coupling capacitor, have an advantageous effect on the load of the mains caused by the AC/DC converter, on the practical use of the AC/DC converter or on the construction costs of the AC/DC converter.

The invention, however, also relates to an integrated circuit which integrates at least the control circuit or which integrates at least the control circuit plus the four switching elements of the bridge circuit with one component. Such integration achieves a further reduction of the construction costs.

A further aspect of the invention is that an AC/DC converter according to the invention is particularly suitable for monitors and for television sets, for example, with flat screens. These apparatuses require an exactly controlled and smoothed power supply with a substantially sinusoidal pattern of the line current consumption in accordance with the legal directives.

BRIEF DESCRIPTION OF THE DRAWINGS

These and other aspects of the invention are apparent from and will be elucidated with reference to the examples of embodiment and particularly with reference to the appended drawings described hereinafter. In the drawings.

DESCRIPTION OF THE PREFERRED EMBODIMENTS

Figure 1:
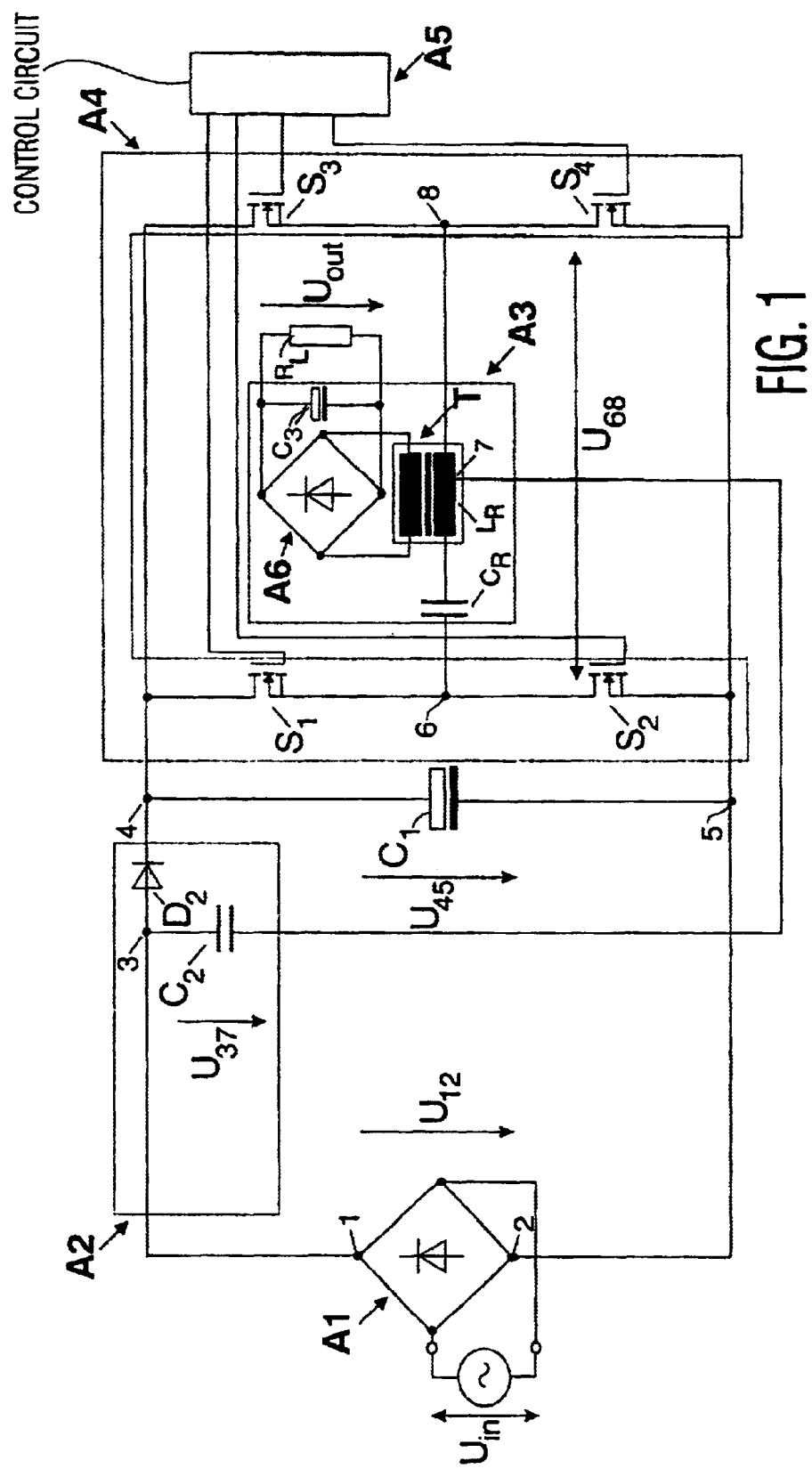
FIG. 1 shows an embodiment of an AC/DC converter according to the invention.

FIG. 1 shows an embodiment of the AC/DC converter according to the invention. The input of the AC/DC converter receives an AC voltage $U_{in}$, which is converted into a rectified AC voltage $U_{12}$ by a rectifier arrangement A1 comprising four diodes, having a positive pole at junction point 1 and a negative pole at junction point 2. The first AC voltage $U_{in}$ is, for example, a sinusoidal 230 volts line voltage having a frequency of 50 Hz.

The rectified AC voltage $U_{12}$ is applied to a series connection of an arrangement A2 working as an up-converter and a first smoothing capacitor arrangement $C_1$ comprising a smoothing capacitor preferably arranged as an electrolyte capacitor. Junction point 2 of the first rectifier arrangement A1 is then coupled to the negative side of the smoothing capacitor arrangement $C_1$ at a junction point 5. Junction point 4 stands for the junction point of the arrangement A2 working as an up-converter and the first smoothing capacitor arrangement $C_1$. Accordingly, $U_{45}$ denotes the smoothed, rectified AC voltage present on the first smoothing capacitor arrangement $C_1$ between the junction points 4 and 5.

The smoothed rectified AC voltage $U_{45}$ is applied to a bridge circuit A4 which comprises a first switching element $S_1$, a second switching element $S_2$, a third switching element $S_3$ and a fourth switching element $S_4$. The switching elements are shown as field effect transistors. However, other embodiments of the switches may be used such as, for example, IGBTs (Isolated Gate Bipolar Transistors). The voltage $U_{45}$ is present both on the series connection formed by the two switching elements $S_1$ and $S_2$ and on the series connection formed by the two other switching elements $S_3$ and $S_4$, i.e., the two series connections of switching elements are connected in parallel and are connected to each other at junction points 4 and 5 and to the first smoothing capacitor arrangement $C_1$.

Between a junction point 6, between the switching elements $S_1$ and $S_2$, and a junction point 8, between the switching elements $S_3$ and $S_4$, a further AC voltage $U_{68}$ is generated from the rectified and smoothed AC voltage $U_{45}$, in that the switching elements $S_1$ to $S_4$ are switched on and off. This further AC voltage $U_{68}$ is applied to the input of the resonance converter A3 at whose output, which is also the output of the AC/DC converter, a DC output voltage $U_{out}$ arises, this DC output voltage being used for supplying power to a load $R_L$. This load $R_L$, represented as an ohmic load here, may generally also be of an inductive, capacitive or mixed type.

The resonance converter A3 comprises resonant circuit elements, i.e., a resonance capacitor $C_R$ and a transformer T which works, for example, as a resonance inductance $L_R$ and takes care of a galvanic separation between the input and output of the resonance converter A3. The resonance capacitor $C_R$ and the primary winding of the transformer T are combined in series between the junction points 6 and 8 and thus form the input side of the resonance converter A3. One side of the resonance capacitor $C_R$ is then connected to junction point 6. The AC voltage arising on the secondary side of the transformer T is rectified by a second rectifier arrangement A6 comprising four diodes and is then smoothed by a second smoothing capacitor arrangement $C_3$ comprising one smoothing capacitor. The voltage drop at the second smoothing capacitor arrangement $C_3$ is the DC output voltage $U_{out}$ present on the output of the AC/DC converter.

The switching elements $S_1$ to $S_4$ are coupled to a control circuit A5 which controls the switching elements by applying suitable control signals to the control inputs of the switching elements, i.e., switches them on (brings them to the conductive mode) or switches them off (brings them to the non-conductive mode). The control circuit A5 is preferably realized by an integrated circuit (IC) which may also include the four switching elements $S_1$ to $S_4$, if desired. The control circuit A5 then controls the switching elements $S_1$ to $S_4$ in two different modes which produce different values of the ratio $U_{out}/U_{68}$ and thus also different values of the ratio $U_{out}/U_{in}$.

In this way, a change of mode may effect, for example, an adaptation to the AC line voltage present on the input of the AC/DC converter. Particularly advantageous is that the change of the ratio $U_{out}/U_{in}$, is by about a factor 2 since, for example, the AC line voltages used in Europe (about 220 to 240 volts) and the USA (about 110 to 127 volts) differ by about a factor 2.

Such adaptation to the AC line voltage present on the input of the AC/DC converter may be made automatically, for example, by the control circuit A5. For this purpose, the control circuit A5 is arranged so that the AC/DC converter is prepared for operation with two different AC line voltages $U_{in}$. Determining which of the two provided AC line voltages $U_{in}$ is then applied to the AC/DC converter in present operation can be effected by the control circuit A5, for example, by measuring the value of the rectified and smoothed AC voltage $U_{45}$, or directly measuring $U_{in}$. To perform the automatic adaptation to the two predefined AC line voltages, the control circuit AS then switches to the second mode if the lower of the two predefined AC line voltages is present at the input of the AC/DC converter, whereas it utilizes a first mode if the higher of the two predefined AC line voltages is present at the input of the AC/DC converter.

In the first mode, the control circuit AS controls the switching elements $S_1$ to $S_4$ in a way that the bridge circuit A4 is operated as a half-bridge circuit. For this purpose, for example, one of the two switching elements $S_3$ or $S_4$ is constantly switched off, and the other one is constantly switched on, thus, for example, $S_3$ is constantly switched off and $S_4$ is constantly switched on. The two further switching elements $S_1$ and $S_2$ are switched on and off alternately. Basically, however, also the roles between the switch pairs $S_3$, $S_4$ and $S_1$, $S_2$ may be interchanged. Due to this half-bridge operation, the rectified and smoothed AC voltage $U_{45}$ is present as a further AC voltage $U_{68}$ on the input of the resonance converter A3, while the switch $S_1$ is conductive, whereas the further AC voltage $U_{68}$ drops to the short-circuit value of ideally 0 volts when the switch $S_1$ is blocking.

In the second mode, the control circuit A5 controls the switching elements $S_1$ to $S_4$ in a way that the bridge circuit A4 is operated as a full-bridge circuit. For this purpose, the switching elements $S_1$ to $S_4$ are alternately switched on or off in pairs, i.e., the two switches $S_1$ and $S_4$ are simultaneously switched on or off and also the two switches $S_2$ and $S_3$ are simultaneously switched off or on, respectively, whereas the switch pairs $S_1$, $S_4$ and $S_2$, $S_3$ are alternately switched on and off. As a result of this full-bridge operation, the rectified and smoothed AC voltage $U_{45}$ is present as a further AC voltage $U_{68}$ on the input of the resonance converter A3 during the conductive mode of the switches $S_1$ and $S_4$, while the negative of the rectified and smoothed AC voltage $U_{45}$ is present in the blocking phase of the switches $S_1$ and $S_4$. Whereas, in half-bridge operation of the first mode in the blocking phase of the switch $S_1$, the zero volts short-circuit voltage is present on the input of the resonance converter A3, in full-bridge operation of the second mode, the negative of the rectified and smoothed AC voltage $U_{45}$ is present. This causes an increase of the ratio $U_{out}/U_{in}$ with furthermore the same circuit conditions.

As an alternative, a so-called phase-shifted PWM full-bridge control of the four switching elements $S_1$ to $S_4$ may be selected for the second mode, just as described in DE 198 24 409 A1 and the literature cited therein "Unitrode Power Supply Seminar, SEM-800, Bob Mammano and Jeff Putsch: Fixed-Frequency, Resonant-Switched Pulse Width Modulation with Phase-Shifted Control, September 1991, pp. 5-1 to 5-7 (more particularly FIG. 1)".

In both modes, the control circuit A5 may also perform an adaptation of the switching frequency and of the duty cycle of the switching elements $S_1$ to $S_4$. Furthermore, when the phase-shifted PWM full-bridge control is used, also the magnitude of the phase shift between the switching instants of the two switch pairs $S_1$, $S_4$ and $S_2$, $S_3$ can be adapted. These measures provide that, for example, the line voltage load of the AC/DC converter and the magnitude and stability of the DC output voltage $U_{out}$ can be further adjusted.

The arrangement A2 working as an up-converter, as shown in FIG. 1, comprises a diode $D_2$ and a coupling capacitor $C_2$. The diode $D_2$ is coupled at junction point 1 to the first rectifier arrangement A1 and at junction point 5 to the first smoothing capacitor arrangement $C_1$. The coupling capacitor $C_2$ is coupled, on one side, to a junction point 3 between the first rectifier arrangement A1 and the diode $D_2$, and on the other side, to a point 7 inside the resonance converter A3. This point 7 inside the resonance converter A3 is realized by dividing the primary winding of the transformer T and tapping out the external point 7.

This coupling provides that a potential $U_{37}$, modulated with the operating frequency of the resonance converter A3 via the coupling capacitor $C_2$ during the operation of the AC/DC converter, is fed back to the junction point 3 inside the arrangement A2 working as an up-converter. Since the diode $D_2$ conducts the current only in the direction from junction point 3 to junction point 4, this feedback causes an up-conversion of the smoothed rectified AC voltage $U_{45}$, this smoothed rectified AC voltage $U_{45}$ dropping off at the first smoothing capacitor arrangement $C_1$. The two diodes of the first rectifier arrangement A1 which conduct the current in the direction to junction point 1, prevent a feedback of current to the input of the AC/DC converter.

For further explanations and versions of this working principle, reference is again made to DE 198 24 409 A1. In this document, further possibilities of realizing point 7 are also shown, which all achieve the object of feeding back a potential $U_{37}$ modulated with the operating frequency of the resonance converter A3 to junction point 3. It will not be hard for the expert to find still further variants.

The fed-back potential $U_{37}$ is modulated with the operating frequency of the resonance converter A3. This operating frequency is normally selected to be substantially higher than the frequency of the AC line voltage $U_{in}$ present on the input of the AC/DC converter, which may be, for example, 50 Hz. This provides considerable cost savings when the resonance converter A3 is built and operated. For the feedback to show the desired results with these high operating frequencies, it is necessary, both for the diode $D_2$ of the arrangement A2 acting as an up-converter and for the two diodes of the first rectifier arrangement A1 which conduct the current into the direction of junction point 1, to choose diodes that react sufficiently fast. The two remaining diodes of the first rectifier arrangement A1 may be "slow" diodes, i.e., it is sufficient for them to be fast enough for the frequency of the AC line voltage $U_{in}$ (for example 50 Hz).

Figure 2:
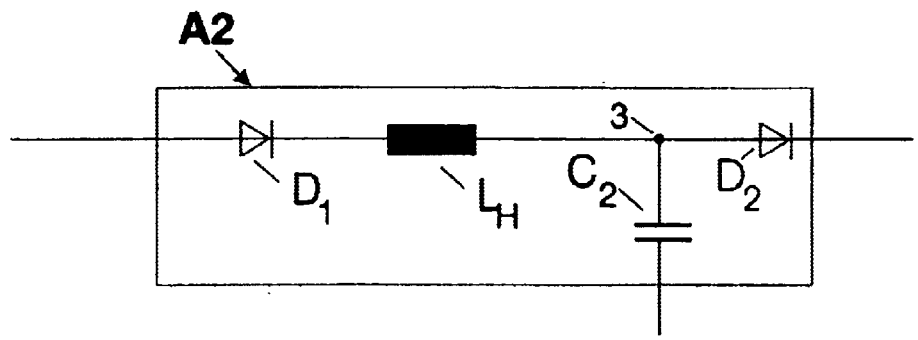
FIG. 2 shows, according to the invention, a variant of the arrangement working as an up-converter, a component of the AC/DC converter according to the invention.

FIG. 2 shows, according to the invention, a variant of the arrangement A2 working as an up-converter.

First, a further diode $D_1$ is included in the arrangement A2 working as an up-converter. This diode $D_1$ is connected between the first rectifier arrangement A1 and the junction point 3 to which the coupling capacitor $C_2$ is coupled. The idea is to use a fast reacting diode for this diode $D_1$ and also for the first diode $D_2$ of the arrangement A2 working as an up-converter. The two diodes of the first rectifier arrangement A1, which conduct the current into the direction of junction point 1, just like the other two diodes of the first rectifier arrangement A1, may be arranged as slow diodes, which leads to cost savings.

Furthermore, an inductance $L_H$ is included in the arrangement A2 acting as an up-converter, this inductance being connected between the further diode $D_1$ and the junction point 3 of the coupling capacitor $C_2$. This inductance $L_H$, however, is an optional component, i.e., the arrangement shown in FIG. 2 without the inductance $L_H$ is satisfactory for the purpose according to the invention. The use of the inductance $L_H$, however, introduces a further energy store in the arrangement A2 working as an up-converter, and thus improves the line voltage load of the AC/DC converter and the up-converting effect of the arrangement A2.

Figure 3:
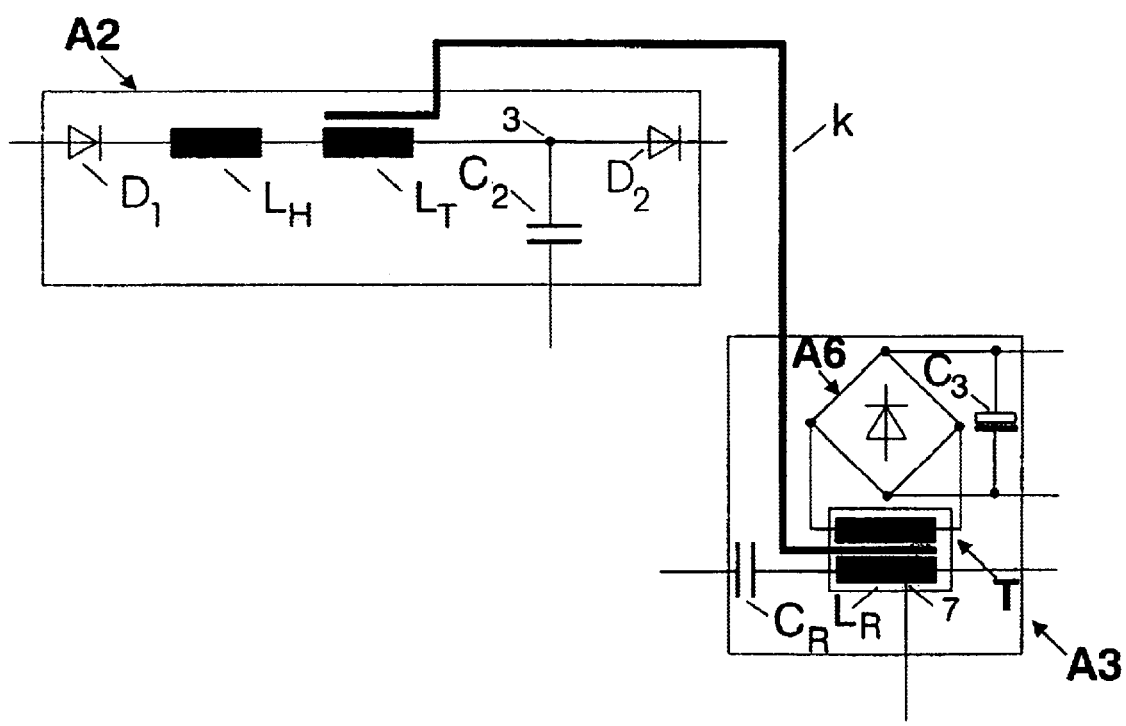
FIG. 3 shows, according to the invention, a further variant of the arrangement working as an up-converter, showing its magnetic coupling with a resonance inductance of the resonance converter.

FIG. 3 shows a further variant according to the invention of the arrangement A2 working as an up-converter.

In addition to the components already represented in FIG. 2, a further inductance $L_T$ is inserted into the arrangement A2 working as an up-converter. This inductance $L_T$ is connected between the inductance $L_H$ and the junction point 3 of the coupling capacitor $C_2$. The inductance $L_T$ is magnetically coupled, via the coupling k, to the resonance inductance $L_R$ of the resonance converter A3. As is also described with reference to FIG. 1, the resonance inductance $L_R$ is realized for this purpose as an inductance of the primary side of the transformer T included in the resonance converter A3. Such a realization, however, is not compulsory, also other forms of the resonance inductance $L_R$ are effortlessly conceivable by the expert.

The magnetic coupling k can be influenced, for example, in that the winding of the inductance $L_T$ is deposited on the same core on which the primary winding of the transformer T is wound. But also other possibilities are conceivable. In this connection, reference is again made to DE 198 24 409 A1 and, more particularly, to the FIG. 8 therein.

The inductance $L_H$ shown in FIG. 3 is again an optional component. By suitably designing the inductance $L_T$, a separate inductance $L_H$ may be omitted.

The magnetic coupling k of the arrangement A2 working as an up-converter to the resonance converter A3 provides a second coupling mechanism, this time an inductive coupling mechanism, in addition to the capacitive coupling caused by the coupling capacitor $C_2$. The influences of the arrangement A2 working as an up-converter to the resonance converter A3 are thus reduced and a favorable operation of the AC/DC converter is obtained. For a further explanation of this mode of operation, reference is again made to DE 198 24 409 A1.

Figure 4:
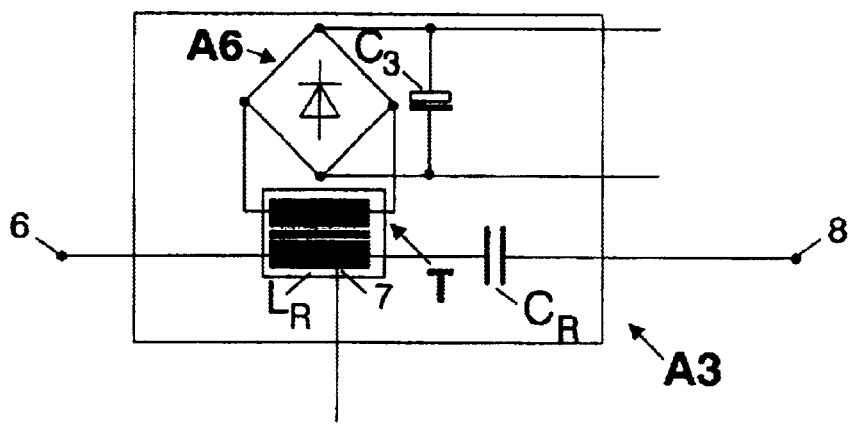
FIGS. 4, 5 and 6 show variants of the resonance converter according to the invention.
Figure 5:
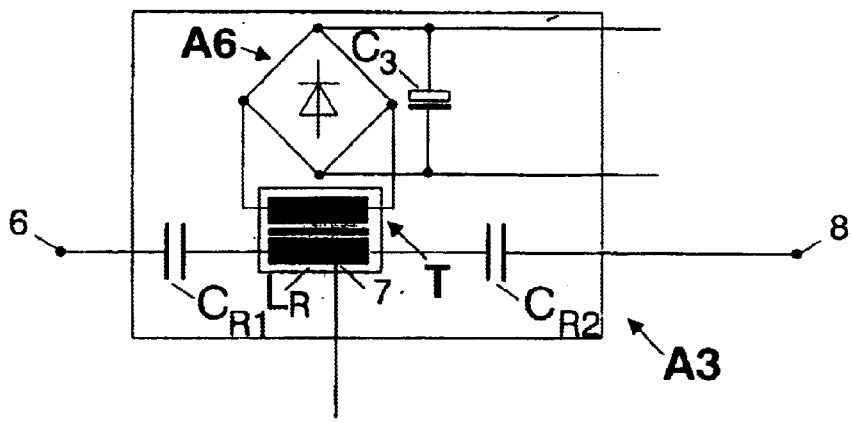
Figure 6:
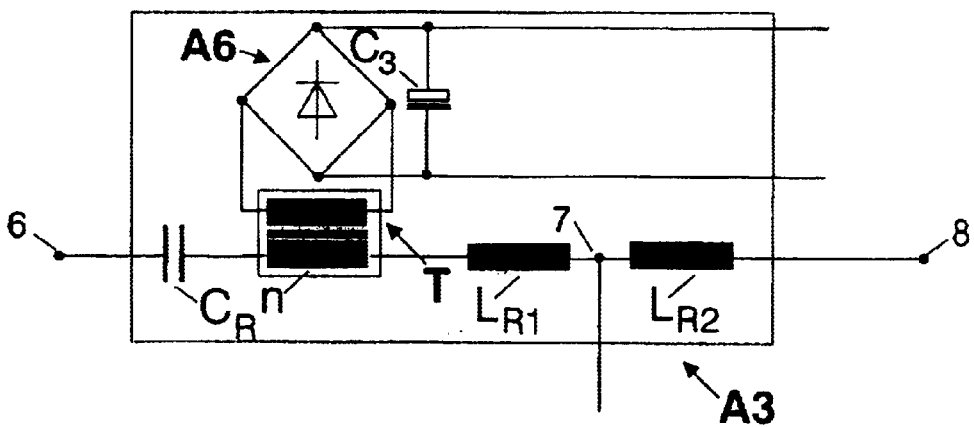

FIGS. 4, 5 and 6 show variants of the resonance converter A3 according to the invention. These and further variants of the resonance converter A3, which are obvious to the expert and may also comprise changes in the load circuit of the resonance converter A3, may advantageously be used for adapting the AC/DC converter to the requirements of the load $R_L$.

In FIG. 4, the order of the resonance capacitance $C_R$ and the transformer T is interchanged in the resonance converter A3. This means that the primary side of the transformer T is coupled, on one side, to the junction point 6 and, on the other side, to the resonance capacitance $C_R$ which, in turn, is coupled on its other side to the junction point 8.

In FIG. 5, the resonance capacitance $C_R$ is replaced by two resonance capacitors $C_{R1}$ and $C_{R2}$, the first resonance capacitor $C_{R1}$, the transformer T and the second resonance capacitor $C_{R2}$ being connected in series in this order between the junction points 6 and 8.

In FIG. 6, again a resonance capacitor $C_R$ and a transformer T are used. In addition, however, two further inductances $L_{R1}$ and $L_{R2}$ are included in the resonance converter A3. These components are connected in series in the following order as a series connection between the junction points 6 and 8: $C_R$, T, $L_{R1}$ and $L_{R2}$.

In FIGS. 4 and 5, the junction point 7, to which the coupling capacitor $C_2$ of the arrangement A2 working as an up-converter is coupled, is further realized, as in FIG. 1, by division of the primary winding of the transformer T. In FIG. 6, on the other hand, the junction point 7 is located between the two further inductances $L_{R1}$ and $L_{R2}$.

All of these circuit arrangements in FIGS. 1 and 3–6 have in common that the junction point 7 on the input side of the resonance converter A3 is surrounded on either one of the two sides by inductances which are realized either discretely ($L_{R1}$ and $L_{R2}$ in FIG. 6) or by a division of the primary winding of the transformer T (in FIGS. 1, 3, 4 and 5). These two inductances limit, on the one hand, as already explained in DE 198 24 409 A1, the currents and voltages fed back by the coupling capacitor $C_2$. On the other hand, the choice of the ratio that is formed by the inductances connected on the two sides of the junction point 7, together with the dimensioning of the further components of the resonance converter A3, forms a further degree of freedom in the arrangement of the AC/DC converter. This degree of freedom may advantageously be used for designing the AC/DC converter for operation with different high AC line voltages, for example, in Europe (about 220 to 240 volts) and in the USA (about 110 to 127 volts), to render constant power available to the load $R_L$, irrespective of the AC line voltage present on the input of the AC/DC converter.

Particularly, in FIG. 6, the operating principle of the position of point 7 becomes clear. For this purpose, we assume that the primary-side inductance introduced by the transformer T is small compared to the two further inductances $L_{R1}$ and $L_{R2}$. Therefore, this primary-side inductance, in FIG. 6, is also denoted by the symbol n instead of the symbol $L_R$ used in the FIGS. 1, 3, 4 and 5. When the ratio $L_{R1}/L_{R2}$ is chosen in a suitable way, the further AC voltage $U_{68}$, present between the junction points 6 and 8, leads in their two half-waves to different potentials at point 7.

If, for example, the case is considered where the bridge circuit A4 is operated in the second mode as a full-bridge circuit, and if $L_{R1}$ is chosen to be larger than $L_{R2}$, it will be recognized that at point 7, while the negative half wave of $U_{68}$, i.e., while junction point 8 is at positive potential, a higher potential evolves than during the positive half-wave of $U_{68}$. Therefore, in this case, the rectified and smoothed AC voltage $U_{45}$ can be up-converted more during the negative half-wave of $U_{68}$, compared to the positive half-wave of $U_{68}$. This clarifies that, according to the invention, by a suitable choice of the components shown in FIG. 6, one can achieve that the DC output voltage $U_{out}$ becomes independent of the AC line voltage $U_{in}$ present on the input of the AC/DC converter. The same result is achieved with the arrangements shown in FIGS. 1 and 3–5 in that the dividing point 7 of the transformer T and also the right dimensioning of the other components are suitably chosen.

In FIGS. 1 and 3–6, the resonance converter A3 is always shown with the transformer T. The advantage of the use of a transformer T is, inter alia, the consequent large translation ratio $U_{out}/U_{68}$ of the resonance converter A3 as well as the galvanic separation between $U_{out}$ and $U_{68}$ caused by T. Furthermore, the realization of point 7 as a division of the primary winding of the transformer T saves on the use of further separate inductances, such as, for example, the inductances $L_{R1}$ and $L_{R2}$ shown in FIG. 6 in the resonance converter A3. However, it is known to the expert that not all applications of an AC/DC converter in the resonance converter really require a transformer. As far as that is concerned, also such variants are included in the invention.

What is claimed is:

1. An AC/DC converter comprising:
    an input for receiving a first AC voltage;
    a first rectifier arrangement for generating a rectified AC voltage from the first AC voltage;
    a first smoothing capacitor arrangement for smoothing the rectified AC voltage thereby forming a smoothed rectified AC voltage;
    a bridge circuit including a first, second, third and fourth switching element for converting the smoothed rectified AC voltage into a further AC voltage,
    a resonance converter comprising resonant circuit elements for converting the further AC voltage into a DC output voltage available on an output of the AC/DC converter;
    a control circuit for controlling the switching elements of the bridge circuit wherein, in a first mode, the bridge circuit is operated as a half-bridge circuit by said control circuit changing switching states of the first and second switching elements and not changing switching states of the third and fourth switching elements, and, in a second mode, the bridge circuit is operated as a full-bridge circuit by said control circuit changing the switching states of the first, second, third and fourth switching elements; and
    an arrangement working as an up-converter connected between the first rectifier arrangement and the first smoothing capacitor arrangement, said arrangement comprises at least one diode and a coupling capacitor, said coupling capacitor being coupled, on one side, to a junction point between the first rectifier arrangement and the at least one diode and, on the other end, to a junction point inside the resonance converter for capacitively coupling the arrangement working as an up-converter to the resonance converter, whereby, during the operation of the AC/DC converters, a potential modulated with the operating frequency of the resonance converter is fed back, characterized in that the AC/DC converter is capable of handling two different first AC voltages, wherein the control circuit provides an automatic change-over between the two modes of the bridge circuit in dependence on the value of first AC voltage applied, whereby with a low first AC voltage, the bridge circuit is operated as a full-bridge circuit, while with a high first AC voltage, the bridge circuit is operated as a half-bridge circuit.

2. The AC/DC converter as claimed in claim 1, characterized
in that the arrangement working as an up-converter further comprises:
a further diode connected in series between the first rectifier arrangement and the junction point to which the coupling capacitor; and
an inductance connected between said further diode and the junction point of the coupling capacitor.

3. The AC/DC converter as claimed in claim 1, characterized
in that the resonance converter includes a resonance inductance, and
in that the arrangement working as an up-converter further comprises:
a further diode connected in series between the first rectifier arrangement and the junction point to which the coupling capacitor is coupled; and
an inductance connected between said further diode and the junction point of the coupling capacitor, said inductance being magnetically coupled to the resonance inductance of the resonance converter.

4. The AC/DC converter as claimed in claim 1, characterized in that the resonance converter comprises, as a resonant circuit element, at least one resonance capacitor and at least one resonance inductance arranged in series,
the resonance capacitor being coupled to a junction point between the first and the second switching elements of the bridge circuit, and
the resonance inductance being coupled to a junction point between the third and the fourth switching elements of the bridge circuit.

5. The AC/DC converter as claimed in claim 1, characterized in that the control circuit the switching frequency and the duty cycle of the switching elements of the bridge circuit.

6. The AC/DC converter as claimed in claim 1, characterized
in that the resonance converter includes a transformer, and
the junction point at which the arrangement operating as an up-converter forms a capacitive coupling with the resonance converter is realized by dividing the primary winding of the transformer and tapping out the dividing point.

7. The AC/DC converter as claimed in claim 1, characterized in that the resonance converter comprises at least two inductances connected in series, and the junction point at which the arrangement operating as an up-converter forms a capacitive coupling with the resonance converter is located in the series connection between the two inductances.

8. An integrated circuit comprising at least the control circuit of the AC/DC converter as claimed in claim 1.

9. The integrated circuit as claimed in claim 8, characterized in that the integrated circuit also includes the four switching elements of the bridge circuit of the AC/DC converter.

10. An AC/DC converter comprising:
an input for receiving a first AC voltage;
a first rectifier arrangement for generating a rectified AC voltage from the first AC voltage;
a first smoothing capacitor arrangement for smoothing the rectified AC voltage thereby forming a smoothed rectified AC voltage;
a bridge circuit including a first, second, third and fourth switching element for converting the smoothed rectified AC voltage into a further AC voltage;
a resonance converter comprising resonant circuit elements for converting the further AC voltage into a DC output voltage available on an output of the AC/DC converter;
a control circuit for controlling the switching elements of the bridge circuit, wherein, in a first mode, the bridge circuit is operated as a half-bridge circuit by said control circuit changing switching states of the first and second switching elements and not changing switching states of the third and fourth switching elements, and, in a second mode, the bridge circuit is operated as a full-bridge circuit by said control circuit changing the switching states of the first, second, third and fourth switching elements; and
an arrangement working as an up-converter connected between the first rectifier arrangement and the first smoothing capacitor arrangement, said arrangement comprises at least one diode and a coupling capacitor, said coupling capacitor being coupled, on one side, to a junction point between the first rectifier arrangement and the at least one diode, and, on the other end, to a function point inside the resonance converter for capacitively coupling the arrangement working as an up-converter to the resonance converter, whereby, during the operation of the AC/DC converter, a potential modulated with the operating frequency of the resonance converter is fed back, characterized in that
the resonance converter comprises at least two inductances connected in series, and
the junction point at which the arrangement operating as an up-converter forms a capacitive coupling with the resonance converter is located in the series connection between the two inductances.

11. The AC/DC converter as claimed in claim 10, characterized in that the arrangement working as an up-converter further comprises:
a further diode connected in series between the first rectifier arrangement and the junction point to which the coupling capacitor; and
an inductance connected between said further diode and the junction point of the coupling capacitor.

12. The AC/DC converter as claimed in claim 10, characterized in that the resonance converter includes a resonance inductance, and in that the arrangement working as an up-converter further comprises:
a further diode connected in series between the first rectifier arrangement and the junction point to which the coupling capacitor is coupled; and
an inductance connected between said further diode and the junction point of the coupling capacitor, said inductance being magnetically coupled to the resonance inductance of the resonance converter.

13. The AC/DC converter as claimed in claim 10, characterized in that the resonance converter comprises, as a resonant circuit element, at least one resonance capacitor and at least one resonance inductance arranged in series, the resonance capacitor being coupled to a junction point between the first and the second switching elements of the bridge circuit, and the resonance inductance being coupled to a junction point between the third and the fourth switching elements of the bridge circuit.

14. The AC/DC converter as claimed in claim 10, characterized in that the AC/DC converter is capable of handling two different first AC voltages, wherein the control circuit provides an automatic change-over between the two modes of the bridge circuit in dependence on the value of first AC voltage applied, whereby with a low first AC voltage, the bridge circuit is operated as a full-bridge circuit, while with a high first AC voltage, the bridge circuit is operated as a half-bridge circuit.

15. The AC/DC converter as claimed in claim 10, characterized in that the control circuit adapts the switching frequency and the duty cycle of the switching elements of the bridge circuit.

16. The AC/DC converter as claimed in claim 10, characterized in that the resonance converter includes a transformer, and the junction point at which the arrangement operating as an up-converter forms a capacitive coupling with the resonance converter is realized by dividing the primary winding of the transformer and tapping out the dividing point.

17. An integrated circuit comprising at least the control circuit of the AC/DC converter as claimed in claim 10.

18. The integrated circuit as claimed in claim 17, characterized in that the integrated circuit also includes the four switching elements of the bridge circuit of the AC/DC converter.

* * * * *